(12) United States Patent
Neuhaus (10) Patent No.: US 11,799,403 B2
(45) Date of Patent: Oct. 24, 2023

(54) BLDC MOTOR WITH REDUCED EMC BEHAVIOR

(71) Applicant: Magna Electronics Inc., Auburn Hills, MI (US)

(72) Inventor: Michael Neuhaus, Wetzlar (DE)

(73) Assignee: Magna Electronics Inc., Auburn Hills, MI (US)

( * ) Notice: Subject to any disclaimer, the term of this patent is extended or adjusted under 35 U.S.C. 154(b) by 383 days.

(21) Appl. No.: 16/197,490

(22) Filed: Nov. 21, 2018

(65) Prior Publication Data

US 2019/0157993 A1 May 23, 2019

Related U.S. Application Data

(60) Provisional application No. 62/589,124, filed on Nov. 21, 2017, provisional application No. 62/589,123, filed on Nov. 21, 2017.

(51) Int. Cl.
*H02P 6/10* (2006.01)
*H02P 29/50* (2016.01)
*H02P 6/28* (2016.01)

(52) U.S. Cl.
CPC ............. *H02P 6/10* (2013.01); *H02P 29/50* (2016.02)

(58) Field of Classification Search
CPC ............. H02M 1/14; H02M 7/537; H02M 2003/1586; H02M 7/5395; H02P 27/06; H02P 27/08; H02P 29/50; H02P 6/14; H02P 6/28
See application file for complete search history.

(56) References Cited

U.S. PATENT DOCUMENTS

| 4,392,099 A | * | 7/1983 | Kuniyoshi | ............... H02P 6/20 318/797 |
| 5,191,269 A | * | 3/1993 | Carbolante | ............... H02P 6/10 318/400.19 |
| 5,744,921 A | | 4/1998 | Makaran | |
| 5,920,166 A | * | 7/1999 | Schlager | ................... H02P 6/10 318/400.19 |
| 6,717,318 B1 | * | 4/2004 | Mathiassen | ............. H02P 27/06 310/179 |

(Continued)

FOREIGN PATENT DOCUMENTS

| DE | 10352508 A1 | 6/2005 |
| DE | 102007059380 B3 | 5/2009 |

(Continued)

OTHER PUBLICATIONS

Wolfgang Oberschelp: "Synchronmaschine", Feb. 1, 2004 (Feb. 1, 2004), XP055071826, retrieved from the Internet: URL: http://elektrotechnik.fh-gelsenkirchen.de/fileadmin/FB1/peelen/pdfs/praktikum/Synchronmashine.pdf (retrieved on Jul. 17, 2013).

(Continued)

*Primary Examiner* — Thai T Dinh
(74) *Attorney, Agent, or Firm* — HONIGMAN LLP (57) ABSTRACT

An electric motor for a vehicle includes a stator, a rotor and a plurality of independent bridge drivers. Each bridge driver supplies a portion of current to the electric motor. There may be a phase shift between each independent bridge driver. Optionally, each bridge driver delivers current at a slew rate that is different from each other independent bridge driver.

20 Claims, 9 Drawing Sheets

(56) References Cited

U.S. PATENT DOCUMENTS

| | | | |
|---|---|---|---|
| 6,718,125 B2 * | 4/2004 | Clark | H02P 6/085 318/245 |
| 6,859,001 B2 * | 2/2005 | Kane | H02P 6/10 318/400.23 |
| 6,965,212 B1 | 11/2005 | Wang et al. | |
| 7,199,535 B2 * | 4/2007 | Welchko | B60L 15/025 307/65 |
| 7,439,697 B2 * | 10/2008 | Miyazaki | H02M 7/48 318/400.41 |
| 8,248,010 B2 * | 8/2012 | Mukai | H02P 29/0241 318/400.21 |
| 8,373,372 B2 * | 2/2013 | Su | H02P 6/17 318/400.26 |
| 9,712,002 B2 | 7/2017 | Arnoldi et al. | |
| 10,337,525 B2 | 7/2019 | Havel | |
| 2004/0105200 A1 | 6/2004 | Ikeda et al. | |
| 2011/0074326 A1 * | 3/2011 | Su | H02P 6/17 318/400.27 |
| 2012/0299636 A1 * | 11/2012 | Van Winkelhoff | H03K 17/08104 327/434 |
| 2014/0042937 A1 | 2/2014 | Schmidt et al. | |
| 2015/0028781 A1 | 1/2015 | Steigerwald et al. | |
| 2016/0036299 A1 * | 2/2016 | Hayashi | H02K 1/16 310/64 |
| 2016/0036371 A1 * | 2/2016 | Yamasaki | B62D 5/046 318/400.22 |
| 2016/0197567 A1 * | 7/2016 | Nishiyama | H02P 6/18 318/400.17 |
| 2017/0117834 A1 * | 4/2017 | Fujii | H02P 27/06 |
| 2020/0076340 A1 * | 3/2020 | Rozman | H02M 7/06 |

FOREIGN PATENT DOCUMENTS

| | | |
|---|---|---|
| DE | 102012210532 A1 | 7/2013 |
| EP | 1466779 A2 | 10/2004 |
| EP | 2133991 A1 | 12/2009 |
| JP | 2006067667 A | 3/2006 |

OTHER PUBLICATIONS

Schulze, M., "Elektrische Servoantriebe" Hanser Verlag, 2008, Seiten 77 bis 81.

* cited by examiner

PRIOR ART

PRIOR ART

BLDC MOTOR WITH REDUCED EMC BEHAVIOR

CROSS REFERENCE TO RELATED APPLICATIONS

The present application claims the filing benefits of U.S. provisional applications, Ser. No. 62/589,123, filed Nov. 21, 2017, and Ser. No. 62/589,124, filed Nov. 21, 2017, which are hereby incorporated herein by reference in their entireties.

FIELD OF THE INVENTION

The present invention relates electrical motors and, more particularly, brushless DC motors.

BACKGROUND OF THE INVENTION

Brushless DC motors of the known type use a single bridge driver to rectify three-phase input voltage.

SUMMARY OF THE INVENTION

The present invention provides a BLDC motor for a vehicle. The electric motor includes a stator, a rotor, and a plurality of independent bridge drivers. The motor may include two bridge drivers, and each may be a B6 bridge driver. Each bridge driver supplies a portion of current to the electric motor. There may be a phase shift between the two bridge drivers and the bridge drivers may be operable to decrease a ripple current of the current provided to the electric motor. Optionally, each bridge driver delivers current at a slew rate that is different from each other independent bridge driver.

These and other objects, advantages, purposes and features of the present invention will become apparent upon review of the following specification in conjunction with the drawings.

DESCRIPTION OF THE PREFERRED EMBODIMENTS

The present invention provides for reducing the ripple current supplied to a brushless DC motor. This may be done by providing two independent B6 bridge drivers to rectify in tandem the motor's voltage supply. The present invention provides the opportunity to split the current across the two independent bridges, and with a phase shift, eliminate the current ripple.

Figure 1A:
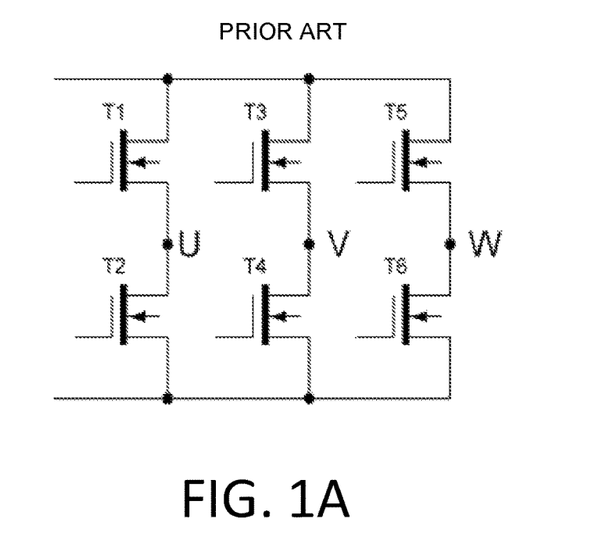
FIGS. 1A-1C are schematics of a known B6 bridge driver for low power (FIG. 1A and FIG. 1B) and high power electric motors (FIG. 1C)
Figure 1B:
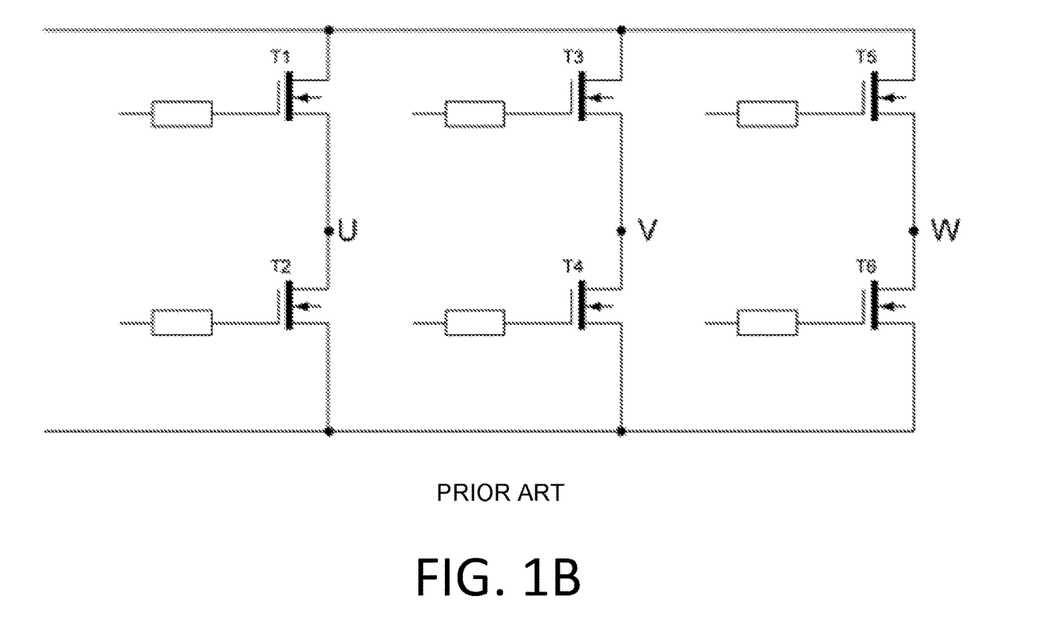
Figure 1C:
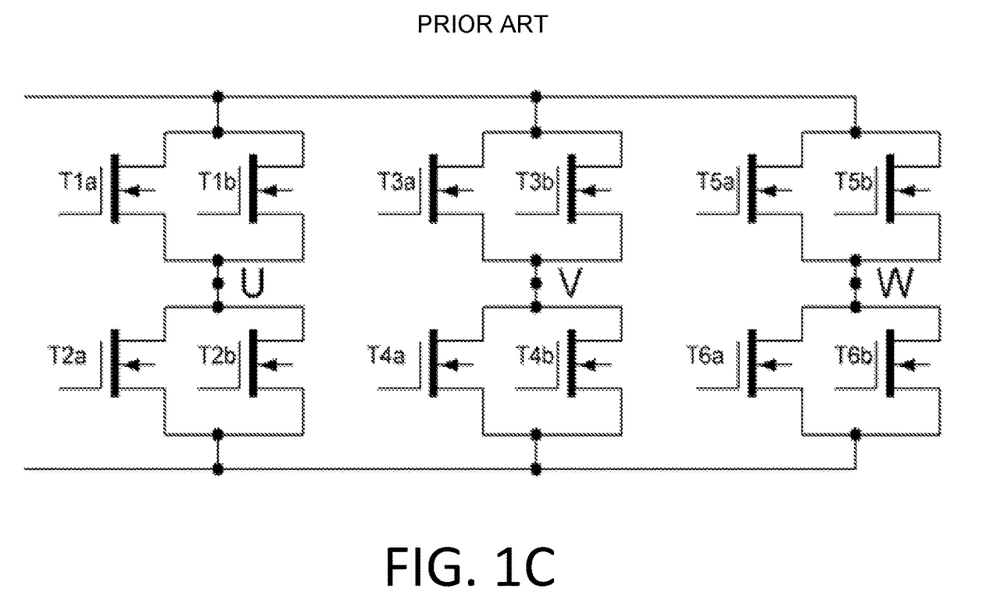
Figure 2:
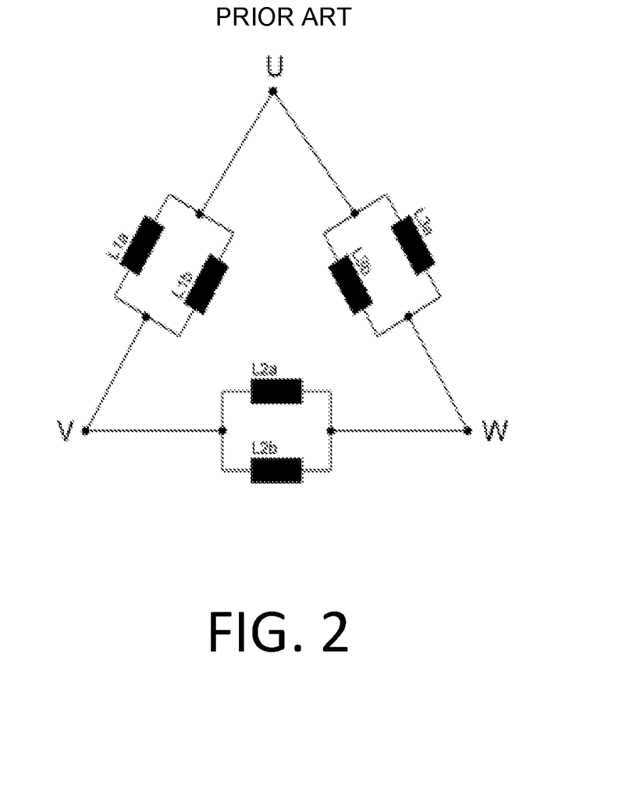
FIG. 2 is a schematic of a known electric motor with two coils in parallel per phase.
Figure 3:
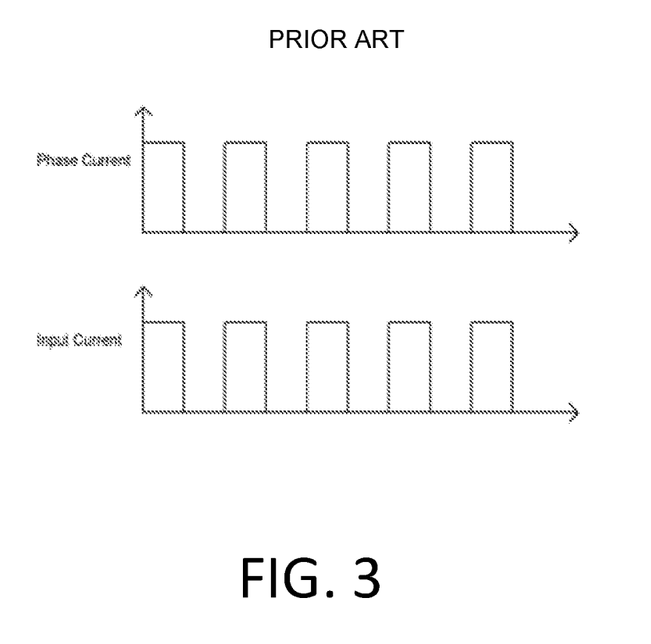
FIG. 3 is a graph of current input to the electric motor of FIG. 2.

Referring now to the drawings and the illustrative embodiments depicted therein, B6 bridge drivers are commonly used to rectify three phase input voltage for brushless DC (BLDC) motors in both low power (see FIG. 1A and FIG. 1B) and high power (see FIG. 1C) operations. A B6 bridge driver is a common three-phase full bridge rectifier with six rectifying semiconductor devices. Such motors often use more than one coil per phase. For example, as shown in FIG. 2, there may be two coils per phase in a three phase ring BLDC motor. The speed of BLDC motors are also commonly controlled through the use of pulse width modulation (PWM). As shown in FIG. 3, when a BLDC motor is rectified by a single B6 independent bridge at a 50 percent duty cycle, the input current alternates between a maximum current and a minimum current, as all of the current is in a single phase (i.e., the input current and the phase current are the same). This leads to a large current ripple that has significant electromagnetic compatibility (EMC) concerns. For example, if a single bridge provides 20 A phase current at a 50 percent duty cycle, the motor will experience a 10 A ripple current.

Figure 4:
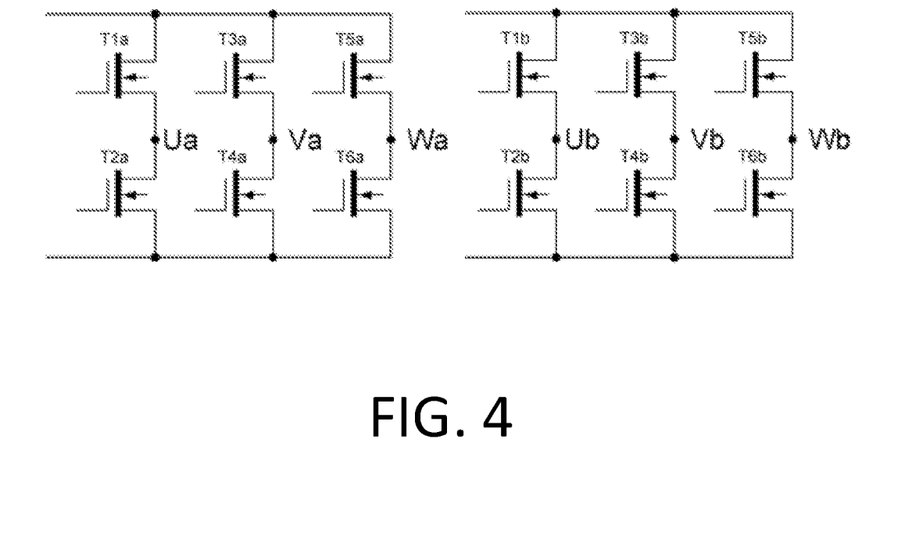
FIG. 4 is a schematic of two independent B6 bridge drivers for an electric motor in accordance with the present invention.
Figure 5:
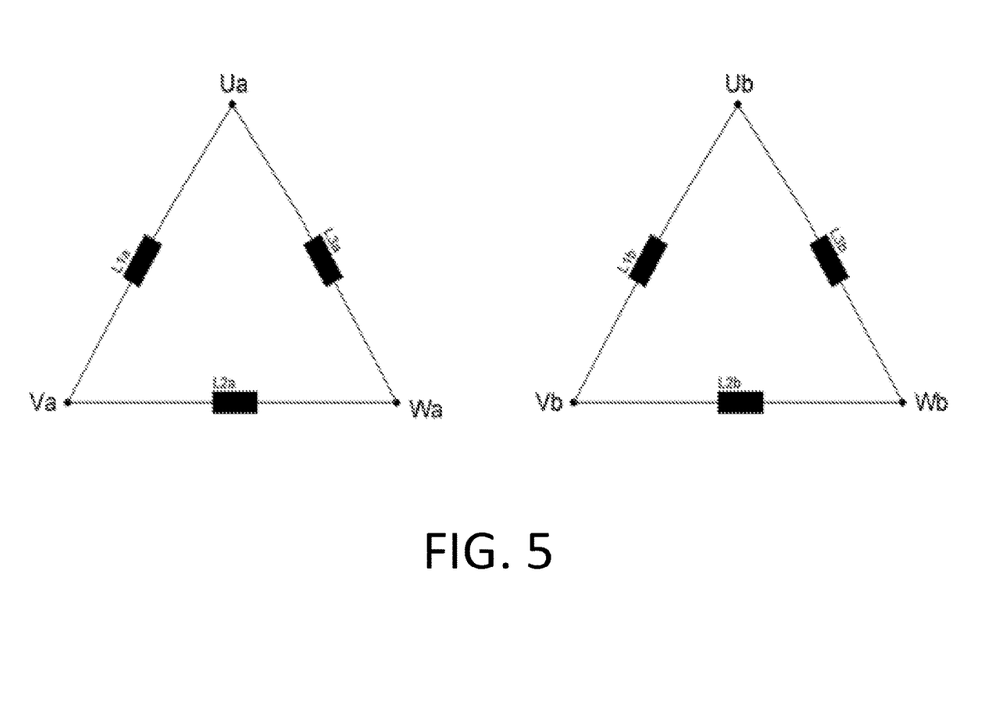
FIG. 5 is a schematic of an electric motor in accordance with the present invention.
Figure 6:
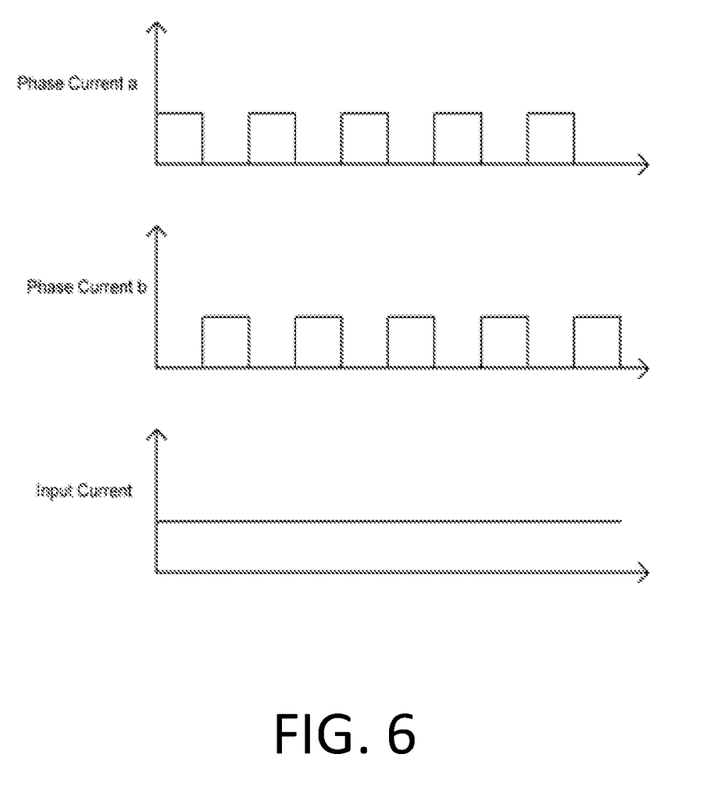
FIG. 6 is a graph of current input to the electric motor of FIG. 5.

In accordance with the present invention, a plurality of independent bridge drivers rectify an input voltage of a BLDC motor. For example, two independent B6 bridge drivers may be provided to rectify three phase input voltage of the BLDC motor (FIG. 4). As shown in FIG. 5, the parallel coils can instead be split across the two independent bridges, creating six phase rings, which allows for half of the input current to flow through each B6 bridge. With such current distribution, and with the two bridge drivers in different phases (e.g., 180 degree phase shift between each bridge), the current ripple can be eliminated, as shown in FIG. 6. Revisiting the previous example, if, with the present invention, 20 A phase current is provided at a 50 percent duty cycle, each bridge driver will deliver 10 A with minimal ripple current experienced by the motor (e.g., filtering capacitors and the like). More than two independent bridge drivers may be used. For example, three bridges (e.g., B6 bridges) could each have a phase shift of 120 degrees and four bridges could have a phase shift of 90 degrees.

Thus, in accordance with an aspect of the present invention, a motor includes two or more independent B6 bridge drivers, thereby reducing ripple current supplied to the electric motor. By reducing the overall current that each bridge provides, cheaper and/or smaller components may be used (e.g., MOSFETs). Further, power losses can be distributed to additional transistors, which can help with power dissipation and cooling by increasing area. Eliminating current ripple provides additional advantageous EMC characteristics (e.g., decreases noise). While the illustrated embodiments depict two independent bridge drivers, it is envisioned that any number of bridge drivers could be used to further distribute the current.

In accordance with another aspect of the invention, a rate of current change supplied to a BLDC is provided by splitting the current across the two independent bridges, and with different slew rates and phases, reduce the rate of current change. Slew rate, as commonly defined, is the change of voltage or current (or any other quantity) of an electrical signal with respect to time.

Figure 7:
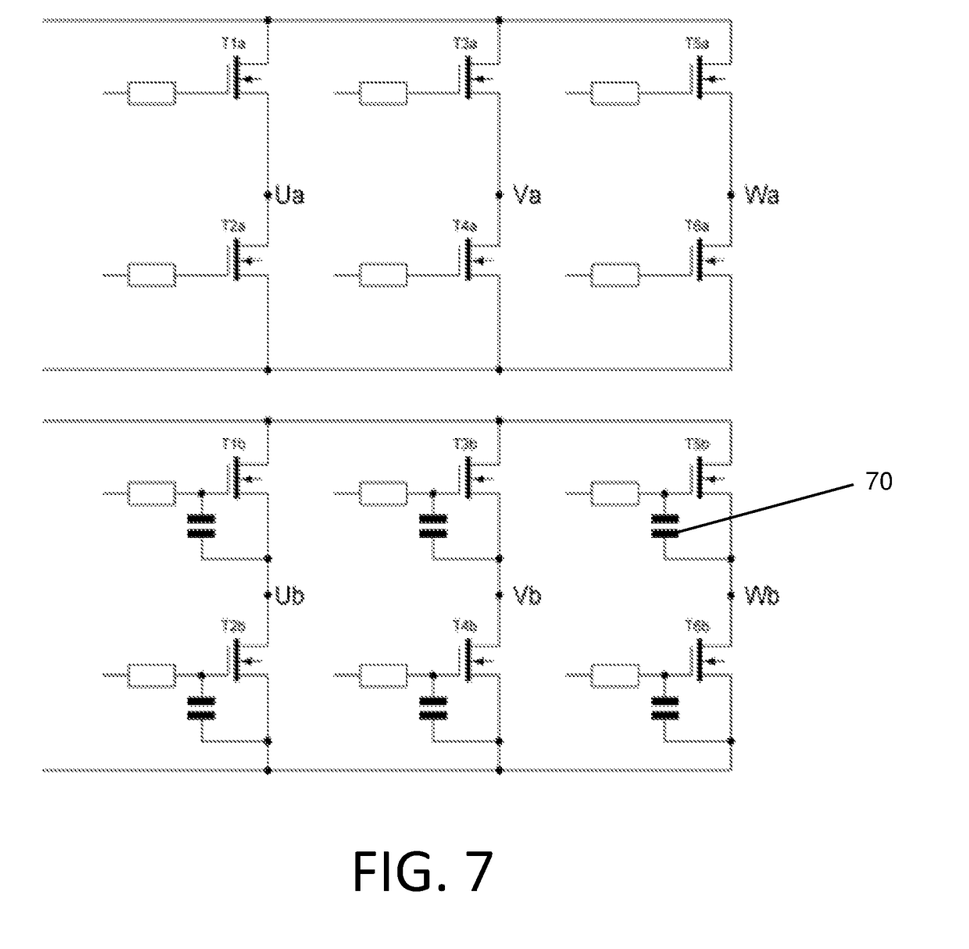
FIG. 7 is a schematic of two independent B6 bridge drivers for an electric motor in accordance with the present invention.
Figure 8:
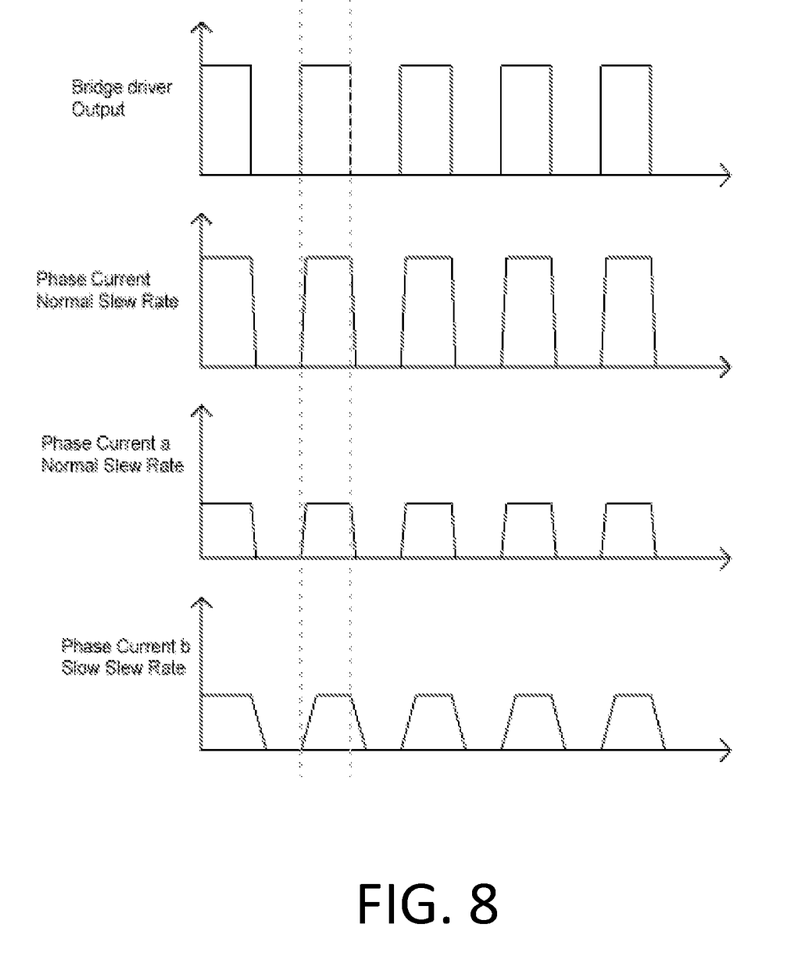
FIG. 8 is a graph of current input to the electric motor of FIG. 7.

As shown in FIG. 7, one (or more) of the independent bridge drivers may have added circuitry to change the slew rate (e.g., capacitors 70 to slow the slew rate). Referring back to FIG. 5, the parallel coils may also be split across the two independent bridges, creating six phase rings, which allows for half of the input current to flow through each B6 bridge. With such current distribution, and with the two bridge drivers in different phases and with different slew rates, the overall rate of current change can be reduced, as shown in FIG. 8. Instead of one large rate of current change, two smaller and different rates of change split across two phases is provided.

Thus, an aspect of the present invention provides a motor that includes two independent B6 bridge drivers, each with a different slew rate and phase, thereby reducing rate of current change supplied to the electric motor. By reducing the overall current that each bridge provides, cheaper and/or smaller components may be used (e.g., MOSFETs). Further, power losses can be distributed to additional transistors, which can help with power dissipation and cooling by increasing area. Decreasing current rate of change provides additional advantageous EMC characteristics (e.g., decreases noise). Additionally, phase rings may be eliminated by contacting the motor coils directly to a printed circuit board of the bridge drivers. While the illustrated embodiments depict two independent bridge drivers, it is envisioned that any number of bridge drivers could be used to further distribute the current.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A brushless direct current (BLDC) electric motor for a vehicle, said BLDC electric motor comprising:
   a stator;
   a rotor;
   a plurality of independent bridge drivers, wherein each independent bridge driver of the plurality of independent bridge drivers comprises a plurality of metal-oxide-semiconductor field-effect transistors (MOSFETs); and
   wherein each independent bridge driver of the plurality of independent bridge drivers receives current and supplies a portion of input direct current to the BLDC electric motor and wherein there is a phase shift between the current each independent bridge driver receives.

2. The BLDC electric motor of claim 1, wherein the plurality of independent bridge drivers comprises two independent bridge drivers.

3. The BLDC electric motor of claim 2, wherein the two independent bridge drivers comprise two independent B6 bridge drivers.

4. The BLDC electric motor of claim 2, wherein the phase shift between the two independent bridge drivers is 180 degrees.

5. The BLDC electric motor of claim 4, wherein half of an input electric current flows through one independent bridge driver and the other half of the input electric current flows through the other independent bridge driver.

6. The BLDC electric motor of claim 1, wherein the plurality of independent bridge drivers comprises a plurality of independent B6 bridge drivers.

7. The BLDC electric motor of claim 1, comprising a plurality of coils for each phase of an input voltage.

8. The BLDC electric motor of claim 7, wherein the input voltage comprises three phases and the plurality of coils for each phase comprises two coils for each phase.

9. The BLDC electric motor of claim 1, wherein the independent bridge drivers are operable to decrease a ripple current supplied to the electric motor.

10. A brushless direct current (BLDC) electric motor for a vehicle, said BLDC electric motor comprising:
    a stator;
    a rotor;
    a plurality of independent bridge drivers, wherein each independent bridge driver of the plurality of independent bridge drivers comprises a plurality of metal-oxide-semiconductor field-effect transistors (MOSFETs); and
    wherein each independent bridge driver of the plurality of independent bridge drivers receives current and supplies a portion of input direct current to the BLDC electric motor and wherein each independent bridge driver delivers current at a slew rate that is different from each other independent bridge driver of the plurality of independent bridge drivers.

11. The BLDC electric motor of claim 10, wherein the plurality of independent bridge drivers comprises two independent bridge drivers.

12. The BLDC electric motor of claim 11, wherein the two independent bridge drivers comprise two independent B6 bridge drivers.

13. The BLDC electric motor of claim 11, wherein half of an input electric current flows through one independent bridge driver and the other half of the input electric current flows through the other independent bridge driver.

14. The BLDC electric motor of claim 10, wherein the plurality of independent bridge drivers comprises a plurality of independent B6 bridge drivers.

15. The BLDC electric motor of claim 10, comprising a plurality of coils for each phase of an input voltage.

16. The BLDC electric motor of claim 15, wherein the input voltage comprises three phases and the plurality of coils for each phase comprises two coils for each phase.

17. The BLDC electric motor of claim 10, wherein the independent bridge drivers are operable to decrease a rate of current change supplied to the BLDC electric motor.

18. The BLDC electric motor of claim 10, wherein at least one of the plurality of independent bridge drivers comprises at least one capacitor, wherein the at least one capacitor decreases the slew rate of the at least one independent bridge driver of the plurality of independent bridge drivers.

19. A brushless direct current (BLDC) electric motor for a vehicle, said BLDC electric motor comprising:
    a stator;
    a rotor;
    a plurality of coils for each phase of an input voltage, wherein the input voltage comprises three phases and the plurality of coils for each phase comprises two coils for each phase;
    a plurality of independent bridge drivers, wherein each independent bridge driver of the plurality of independent bridge drivers comprises a plurality of metal-oxide semiconductor field-effect transistors (MOSFETs); and
    wherein each independent bridge driver of the plurality of independent bridge wherein each independent bridge driver of the plurality of independent bridge drivers receives current and supplies a portion of input direct current to the BLDC electric motor and wherein there is at least one selected from the group consisting of (i) a phase shift between the current each independent bridge driver receives and (ii) each independent bridge driver delivers current at a slew rate that is different from each other independent bridge driver of the plurality of independent bridge drivers.

20. The BLDC electric motor of claim 19, wherein the plurality of independent bridge drivers comprises two independent B6 bridge drivers.

\* \* \* \* \*

UNITED STATES PATENT AND TRADEMARK OFFICE
CERTIFICATE OF CORRECTION

PATENT NO. : 11,799,403 B2
APPLICATION NO. : 16/197490
DATED : October 24, 2023
INVENTOR(S) : Michael Neuhaus Page 1 of 1

It is certified that error appears in the above-identified patent and that said Letters Patent is hereby corrected as shown below:

In the Specification

Column 2
Lines 24-25, "provides 20 A phase" should be --provides 20A phase--
Line 26, "10 A ripple" should be --10A ripple--
Line 39, "20 A phase" should be --20A phase--
Line 40, "deliver 10 A" should be --deliver 10A--

In the Claims

Column 4
Claim 19, Lines 61-63, remove the duplicate line "wherein each independent bridge driver of the plurality of independent bridge"

Signed and Sealed this
Twenty-first Day of November, 2023

Katherine Kelly Vidal
*Director of the United States Patent and Trademark Office*